United States Patent Office 3,776,945
Patented Dec. 4, 1973

3,776,945
**METHOD OF DEPOLYMERIZING POLY-
ETHYLENE TEREPHTHALATE**
Ferdinando Ligorati, Giancarlo Aglietti, and Vittorio
Emanuele Nova, Milan, Italy, assignors to Società
Italiana Resine S.p.A., Milan, Italy
No Drawing. Filed Nov. 16, 1971, Ser. No. 199,352
Claims priority, application Italy, Nov. 26, 1970,
32,207/70
Int. Cl. C07c 69/82
U.S. Cl. 260—475 D          5 Claims

ABSTRACT OF THE DISCLOSURE

Dimethyl terephthalate and ethylene glycol are recovered from polyethylene terephthalate by depolymerising in methanol, instantaneous evaporation after removal of the methanol, and condensation of the vapours in cold methanol.

---

The present invention relates to a process for depolymerising polyethylene terephthalate and for recovering the monomers produced.

More precisely, the present invention relates to the recovery of useful products from polyethylene terephthalate waste obtained in the production of polyester fibres.

Even more precisely, the present invention relates to a process for recovering dimethyl terephthalate and ethylene glycol obtained by depolymerisation of polyethylene terephthalate waste.

In the production of polyester fibres and yarns from terephthalic acid or dimethyl terephthalate, it is known that a considerable amount of polyethylene terephthalate waste may be produced.

The term waste is used to refer to all those polymerised and other products based on terephthalic acid and/or dimethyl terephthalate and ethylene glycol which are obtained as residual or waste products in all the processes which convert the monomers to the final polyester fibre or yarn.

For the polyester fibre or yarn production process to be economical, the porblem therefore arises of converting the polyethylene terephthalate waste into uesful products. In the industry, one of the more widely used systems requires the waste to be treated at a high temperature for rather prolonged times with an excess of water or aqueous solutions. The terephthalic acid which is separated off after filtration of the solution, purification and drying, may be used in the production of polyethylene terephthalate.

This type of procedure however presents some difficulties: in particular, the presence of substantial quantities of additives in the waste, for example bleaching products such as titanium dioxide, flameproofing products, and stain resistors, creates substantial complications during filtration and leads to ready clogging of the filters. All this has a by no means negligible effect on the simplicity of execution and on the economics of the process.

According to another procedure, the polyethylene terephthalate waste is treated at high temperature with an excess of ethylene glycol.

The solution obtained is filtered and the di(2-hydroxyethyl)-terephthalate formed may be crystallised from the solution by cooling.

This however is a troublesome process which offers the same difficulties of filtration as the treatment with water or aqueous solutions.

Finally, the industry is showing ever-increasing interest in the recovery of useful products from polyester fibre wastes by treating the polyethylene terephthalate with methanol. This process consists essentially in treating the polyethylene terephthalate waste with an excess of methanol at elevated pressure and temperature, in separating the non-reacted methanol and in vaporising the dimethyl terephthalate and ethylene glycol from the residue, working at elevated temperatures and using relatively long contact times.

In view of the working conditions, the vaporised products contain impurities which are difficult to separate and which produce drawbacks in polymerisation of the separated monomers to produce polyethylene terephthalate.

Furthermore, there is a formtion of high boiling substances by partial condensation of the monomers, with a consequent lowering of the yield of useful products. Probably, this phenomenon is favoured by the long contact times and by the presence, in the products which are subjected to evaporation, of traces of the condensation catalysts which are used in the production of the polyethylene terephthalate.

An object of the present invention is to provide a process for depolymerising polyethylene terephthalate waste which makes it possible to obtain dimethyl terephthalate and ethylene glycol of a high purity level.

A further object of the present invention is a process of depolymerising polyethylene terephthalate waste which makes it possible to obtain dimethyl terephthalate and ethylene glycol with a high yield. Further objects will become manifest from the following description.

This process is based essentially on maintaining low values both in the contact times and in the temperatures during the stage of the process in which the dimethyl terephthalate and the ethylene glycol are separated from the higher boiling products. More precisely, it has been found that by carrying out this separation by means of evaporation, pure monomers can be obtained with a high yield when the contact times in the said evaporation are kept at levels equal to or less than 4 minutes and the temperatures are maintained equal to or less than 200° C.

More particularly according to the process of the present invention, the polyethylene terephthalate waste, in sub-divided form, preferably of dimensions comprised between 4 and 35 mesh, is initially treated at a temperature between 100 and 300° C. and preferably between 160 and 220° C., and at a pressure comprised between 1 and 150 atmospheres with methanol in such a quantity that the proportion of methanol to waste is between 1:1 and 10:1 by weight, in the presence of acid catalysts or otherwise.

In order to attain a yield of depolymerised substance of not less than 90% in moles in respect of the polyethylene terephthalate, it is necessary for the treatment to be carried out for at least 30 minutes and preferably for between 1 and 4 hours.

Acid catalysts which may be used for example are strong inorganic acids such as sulphuric acid and phosphoric acid.

From the depolymerised substance thus obtained, the free methanol present is separated, for example by evaporation at low pressure. As previously stated, the dimethyl terephthalate and the ethylene glycol are separated from the residual mass by evaporation, contact times equal to or less than 4 minutes and temperatures equal to or less than 200° C. being maintained. These conditions are achieved by instantaneous evaporation of the mixture in an ambient maintained at a pressure of 1 to 10 mm. Hg.

In practice, thin film type evaporators are used, such as those commercially known as Luwa evaporators.

According to the process of the present invention, the vapours are precipitated with cold methanol. The working temperature is below the boiling point of the methanol and is preferably room temperature. In this way, a suspension of dimethyl terephthalate crystals in a liquid phase consisting of methanol and ethylene glycol is formed. Then, the dimethyl terephthalate crystals are separated, for example by centrifugal treatment, and finally the ethylene glycol is separated from the methanol by distillation.

The methanol which is thus obtained may be recycled to the vapour precipitation stage.

The dimethyl terephthalate obtained after drying may be used directly in the production of polyethylene terephthalate for fibres.

EXAMPLE 1000 g. polyester waste containing 4.5% $TiO_2$ and 0.5% of other impurities were mixed in sub-divided form of dimensions ranging from 4 to 7 mesh with 3000 g. methanol and treated for 4 hours in an autoclave at 70 atm. at a temperature of 220° C.

The product of reaction, cooled to 150° C., was fed to an instantaneous evaporator maintained at 150° C., in which the nonreacted methanol was separated and recovered by condensation.

The residue of instantaneous evaporation was in turn supplied to a Luwa-type thin layer evaporator maintained at 180° C. and at a pressure of 5 mm. Hg.

In the thin layer evaporator, a contact time equal to 0.5 minutes was maintained.

In this way, the dimethyl terephthalate and ethylene glycol vapours emerged at the top of the evaporator while the non-depolymerised oligomers, titanium dioxide, tars and other impurities present are discharged at the bottom.

The vapours were subjected to precipitation with cold methanol, a suspension of dimethyl terephthalate crystals in a liquid phase consisting of methanol and ethylene glycol being subsequently obtained.

The resultant dimethyl terephthalate, after being separated by centrifugal treatment and dried, exhibited the following characteristics:

| | |
|---|---|
| Setting point | 142° C. |
| Acidity number | Less than 10. |
| $TiO_2$, $Sb_2O_3$ and calcium ions | Absent. |
| Hazen colour | 25. |
| Non-depolymerised oligomers. | Absent. |

By working in this way, 885 g. dimethyl terephthalate were recovered from the polyethylene terephthalate waste, denoting a yield of 92%.

Furthermore, rectification of the crystallisation "water" made it possible to recover 290 g. ethylene glycol, with a yield of 92%.

What we claim is:

1. A process for recovering dimethyl terephthalate and ethylene glycol from polyethylene terephthalate waste, which comprises:

(1) depolymerizing, at a temperature of from 100 to 300° C. and a pressure up to 150 atmospheres, and for a period of at least 30 minutes, polyethylene terephthalate waste with excess methanol, in the presence of a strong inorganic acid catalyst, the amount by weight of methanol to polyethylene terephthalate waste ranging from between 1 and 10 to 1, (2) separating any unreacted methanol from the depolymerizate of step (1), (3) separating from the residual mass, the dimethyl terephthalate and ethylene glycol by means of evaporation at a temperature of 200° C. or less, but not lower than a temperature sufficient to initiate evaporation, for a period of less than 4 minutes, (4) condensing the subsequent evolved vapors with cold methanol, (5) separating the dimethyl terephthalate crystals from the resulting suspension, and (6) recovering ethylene glycol from the liquid in which the dimethyl terephthalate was crystallized.

2. A process according to claim 1, in which the waste is subdivided to 4 to 35 mesh.

3. A process as claimed in claim 1, characterised in that the waste is treated with methanol at a temperature of between 160 and 220° C. for a period ranging from 1 to 4 hours.

4. A process as claimed in claim 1, characterised in that a pressure of between 1 and 10 mm. Hg is maintained throughout the instantaneous evaporation of the dimethyl terephthalate and ethylene glycol.

5. A process as claimed in claim 1, characterised in that instantaneous evaporation of the dimethyl terephthalate and of the ethylene glycol is carried out in a thin film evaporator.

References Cited

UNITED STATES PATENTS

| | | | |
|---|---|---|---|
| 3,148,208 | 9/1964 | Siegez et al. | 260—475 D |
| 3,321,510 | 5/1967 | Lote et al. | 260—475 D |

FOREIGN PATENTS

| | | | |
|---|---|---|---|
| 551,307 | 12/1959 | Belgium | 260—475 D |
| 1,061,542 | 3/1967 | Great Britain | 260—475 D |

LORRAINE A. WEINBERGER, Primary Examiner

E. J. SKELLY, Assistant Examiner

U.S. Cl. X.R.

260—2.3